(No Model.)
J. D. TRACY.
HARVESTER RAKE.
No. 268,151.  Patented Nov. 28, 1882.
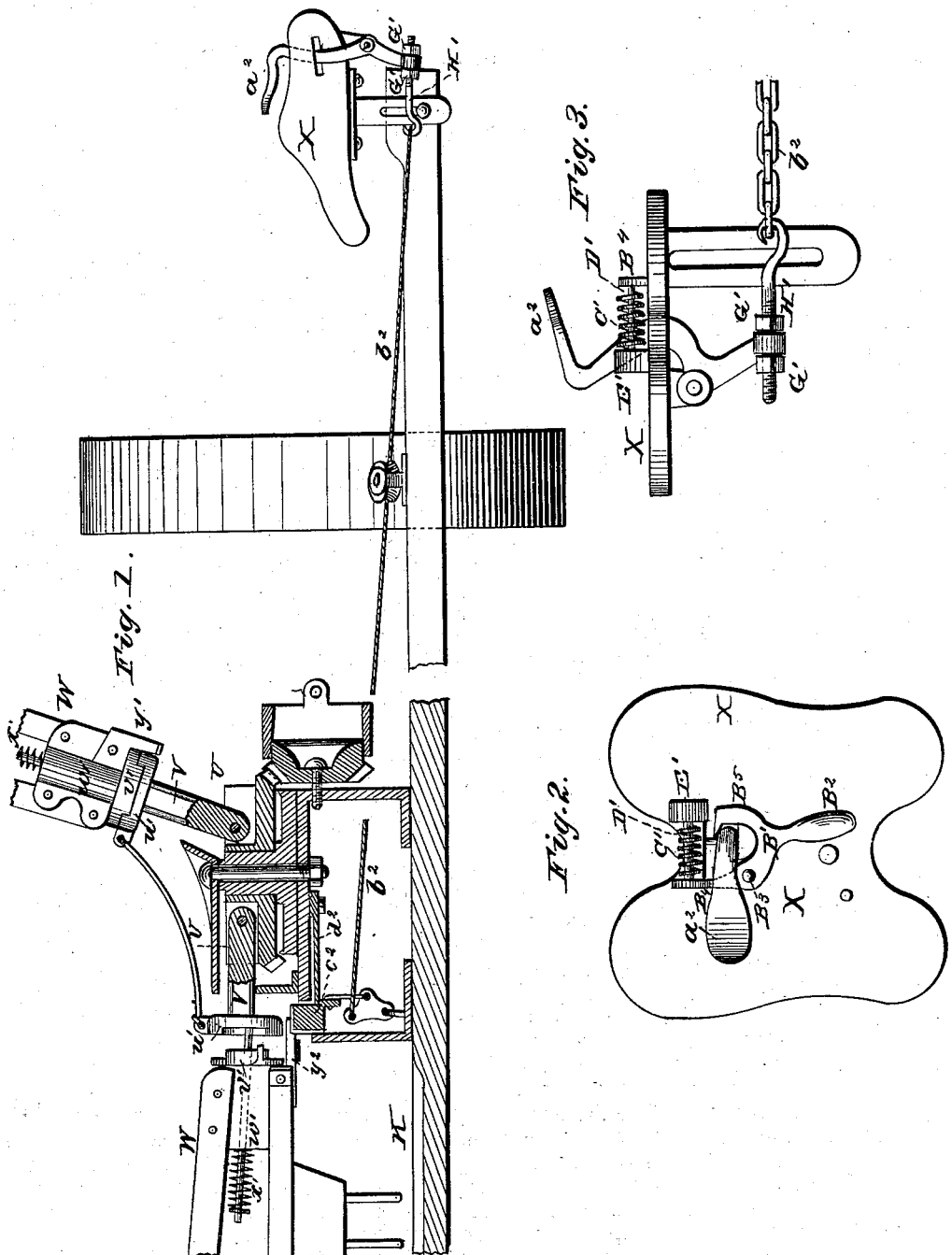
Witnesses:
Phil. C. Dieterich
John Sedgwick
Inventor:
John D. Tracy
per:
Manahan & Ward.
Attorneys.

UNITED STATES PATENT OFFICE.

JOHN D. TRACY, OF STERLING, ILLINOIS.

HARVESTER-RAKE.

SPECIFICATION forming part of Letters Patent No. 268,151, dated November 28, 1882.

Application filed August 11, 1882. (No model.)

*To all whom it may concern:*

Be it known that I, JOHN D. TRACY, a citizen of the United States, residing at Sterling, in the county of Whitesides and State of Illinois, have invented certain new and useful Improvements in Harvester-Rakes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improvement in the raking devices of the harvester patented to Otto Kromer and Frank Rinkleff, March 2, 1880, by Letters Patent of the United States No. 225,064, and will be more readily understood from a preliminary reference to the raking devices of the harvester described in said patent.

In the aforesaid harvester the revolving rake-head also constitutes the reel, and is described as to its constructions and operations as follows in said Letters Patent:

"A plan view of this revolving rake-head is shown in Figure 14, and it is provided with four pairs of ears, U, each pair being at right angles with the pairs on either side, and between each pair of these lugs there is pivotally secured an arm, V, and to each of these arms there is pivotally secured a rake, W, in the following manner: Upon each of said arms there is a clutch formed of two parts, $u'$ and $v'$, the former of which is rigidly secured to the arm, while the latter is sleeved thereon, and has secured to it a thimble-plate, $w'$, and between the outer end of said thimble-plate and a washer on the end of said arm the latter is surrounded by a coil-spring, $x'$, to keep the two parts of the clutch in engagement, except when forcibly disengaged, as hereinafter described. To this plate is attached a lug, $y'$, which may or may not be made removable, and its purpose is to cause the rake to rake off the platform at every revolution or not, as desired. By being brought into contact with a trip operated from the foot-rest of the operator the lug will disengage the clutch upon each arm as in its rotation it reaches the front of the platform K, and the rake will roll and not rake off. If the operator desires that one of the rakes should perform its function of raking off the platform, he, when such rake reaches the proper point, places his foot upon the double bell-crank lever $a^2$, which is pivoted and passes through a slot in the foot-rest X, and this bell-crank, being connected by the chain $b^2$ with the trip $c^2$, withdraws the same when the rake performs its functions, and, the operator relieving the pressure upon the bell-crank, the trip resumes its position, and the succeeding rakes will roll and pass over the platform without raking off the grain thereon. * * * In the rotation of the rake-head, and when it is not desired to have it rake the grain from the platform when the rake passes to the rearward from the front of the platform, the lug $y^2$ strikes the trip $c^2$, which causes the part $v'$ to disengage from the part $u'$ of the clutch when the rake is partially rotated, and as the rake continues its travel its side slides on the segmental spring Y, which has an upward and rearward incline and inward curvature, as shown in Fig. 12. This motion rolls the rake in a nearly horizontal position," &c.

As my invention refers solely to improvements in actuating the said trip $c^2$, and the residue of the machine and its mode of operation are fully shown in said patent, I do not deem it essential to describe or show more than my invention and its mode of attachment to the other parts of the machine.

Corresponding parts are lettered herein as in said Letters Patent.

In my drawings, Fig. 1 is a front view of the part of the machine embodying my invention. Fig. 2 is a plan view of the driver's foot-rest X. Fig. 3 is a front elevation of such foot-rest, showing the position and attachments of the foot-lever or bell-crank $a^2$.

W W are the rakes. V V are the respective arms thereof, to which such rakes are secured, as described in the above-given quotations from said former patent. The thimble-plate $w'$ referred to is shown in Fig. 1 herein, having attached thereto the lug $y'$. But two of such rakes are shown, although four are used.

Part of my invention consists in making the lug $y^2$ on one of the thimble-plates $w'$ of but one-half the depth of the lugs $y'$ on the other rake-arms, so that the trip $c^2$ may be held at such withdrawn position as to trip but three out of the four rakes. In order to effect such partial withdrawing of the trip $c^2$, I place on the foot-rest X the horizontal spring-catch B', which has a rearward projection or handle $B^2$ and is pivoted on the top of such foot-rest at $B^3$. The catch B' has the forward projection $B^4$, to which is attached one end of the horizontal coiled spring C'. The spring C' is coiled around and suitably attached to the stem D', which latter is integral with the vertical flange E', formed on the upper surface of the foot-rest X. The catch B' has the half-circled clutch end $B^5$, which is so constructed and is of such length that when the driver places his foot against the handle $B^2$ of the catch B,' and moves such handle in the direction of the clutch end $B^5$, the latter will engage the foot-lever $a^2$ at a point above the foot-rest X. The outer end of the clutch $B^5$ is crooked outward, so that when engaging such lever $a^2$ it will draw and hold the upper end of the latter toward the rakes sufficient for the trip $c^2$ to permit the lug $y^2$ to pass without being actuated, but not so far but what the lug $y'$ will be engaged and actuated by said trip $c^2$, as described in said Letters Patent. The spring C' assists in holding the catch B', when in position, from being jarred loose. As a reasonable degree of exactness in the length of the chain $b^2$ is essential, I provide the screw-hook H' and nuts G', by means of which I adjustably attach the outer end of the chain $b^2$ to the lower end of the foot-lever $a^2$, whereby any wear of the parts or change in the length of such chain can be readily compensated. Heretofore the mode of adjusting the length of the chain $b^2$ has been to take out or insert a link; but such change, being not less than a link's length, was not sufficiently exact in many instances.

In harvesters of this class as heretofore constructed each rake W either had or had not a full-sized flange, $y'$. The difficulty with this construction was that if all of the rakes had such flange, then the trip $c^2$ had to be withdrawn by the action of the driver's foot each time the grain was raked off. As this was necessary about each rod of forward movement, it entailed too much labor on the driver, and also took his attention constantly from his team. When the flange $y'$ was left off of any particular rake the driver had no control of the raking, and the grain being of heavier growth in some places than in others, the sheaves were of unequal size. Again, the operating-rake would often deposit the sheaf at the corner of the field, where it would be trampled by the team in turning. By my improvement the driver, having set the spring-catch B', has no more care thereof, if he wishes to rake off once at each revolution of the entire rake-head. Should he wish to carry the gavel farther, he has merely to kick the catch B' loose, when the spring $d^2$ will throw the trip $c^2$ into engagement with lugs $y'$ and $y^2$ on each of the rakes W. If he desires each rake to rake off, he has merely to place his foot on the top of the lever $a^2$ and force the latter entirely down upon the rest X, when the trip $c^2$ will be so far withdrawn as to engage none of the lugs $y'$. The catch B' is easily and quickly engaged or disengaged by the action of the driver's foot.

By my invention the driver can make the rake rake off once in four times, every time, or not at all, and can readily change from each one of these conditions to the others.

What I claim as my invention, and desire to secure by Letters Patent, is—

1. The combination of the spring-catch B', foot-lever $a^2$, chain $b^2$, trip $c^2$, and thimble-plate $w'$, provided with lugs $y'$ and $y^2$ of different depths, whereby the raking off may be entirely suspended, or may occur at regular or irregular intervals, discretionary with the operator, substantially as herein shown, and for the purpose specified.

2. The combination of the catch B', foot-lever $a^2$, foot-rest X, screw-hook H', chain $b^2$, bell-crank plate $e^2$, and trip $c^2$, substantially as shown, and for the purpose described.

In testimony whereof I affix my signature in presence of two witnesses.

JOHN D. TRACY.

Witnesses:
B. HUBBARD,
C. L. SHELDON.